July 28, 1942.  E. G. STAUDE ET AL  2,291,063
BOX MAKING MACHINE
Filed Aug. 26, 1940  13 Sheets-Sheet 9
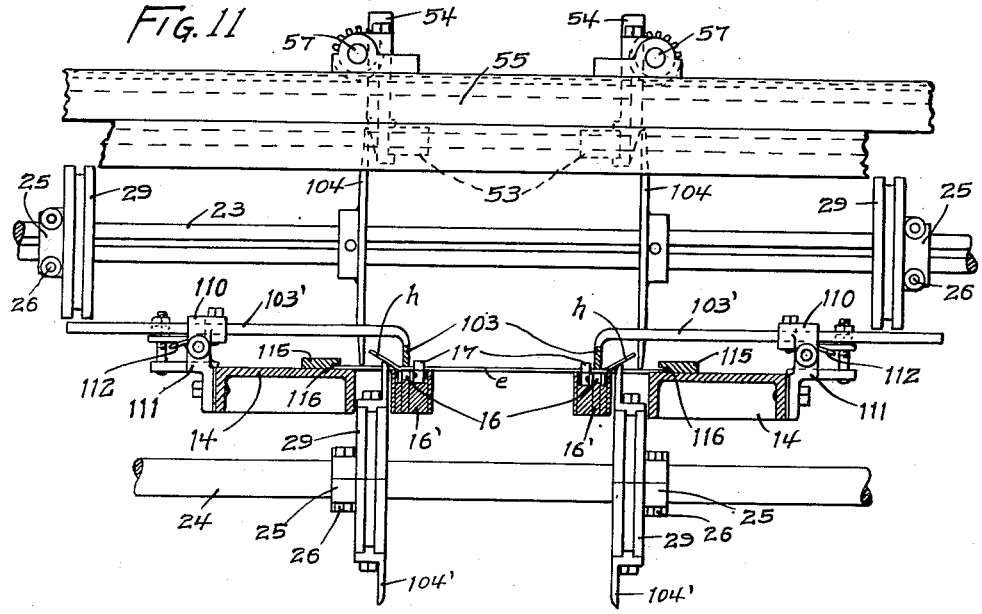
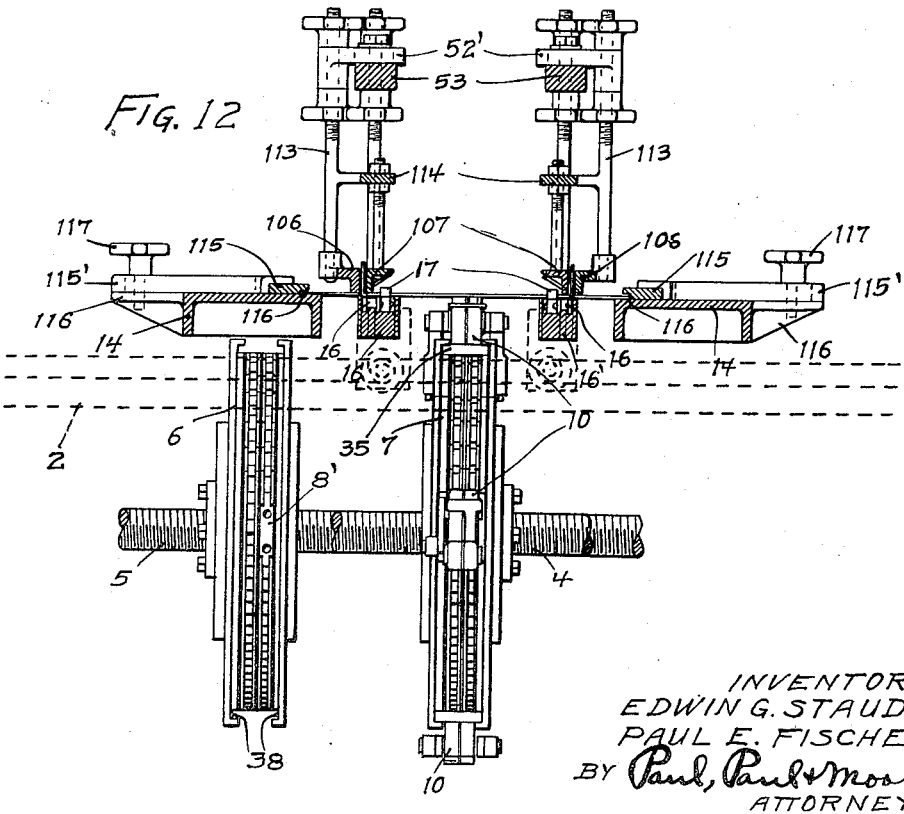
INVENTORS
EDWIN G. STAUDE
PAUL E. FISCHER
BY Paul, Paul & Moore
ATTORNEYS July 28, 1942.    E. G. STAUDE ET AL    2,291,063
BOX MAKING MACHINE
Filed Aug. 26, 1940    13 Sheets-Sheet 10
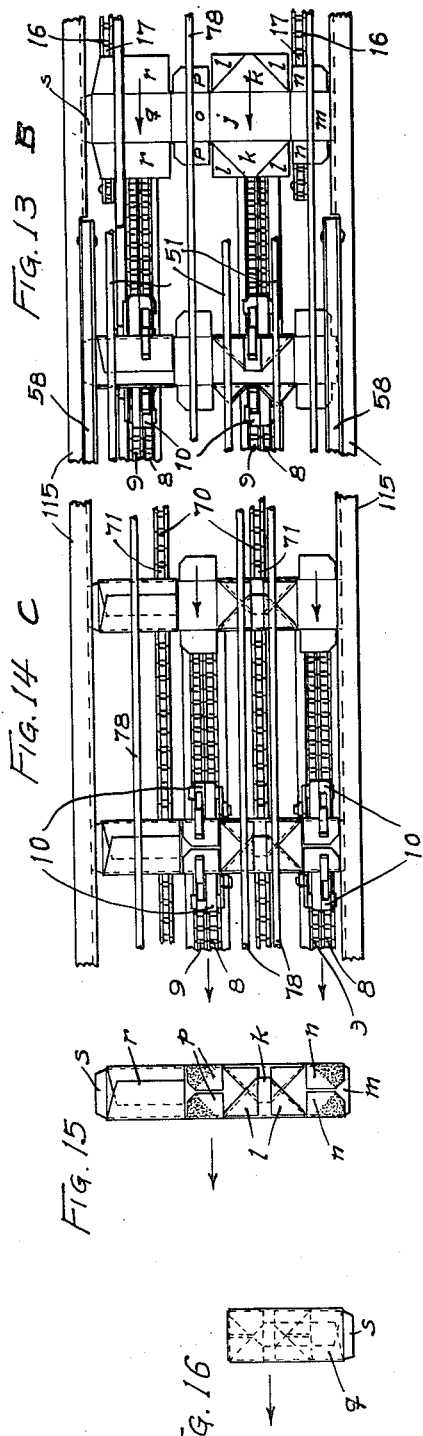
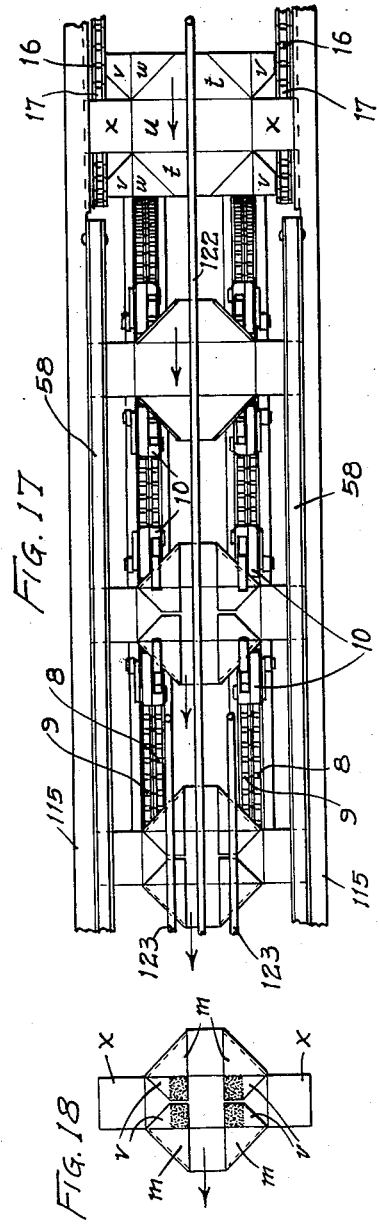
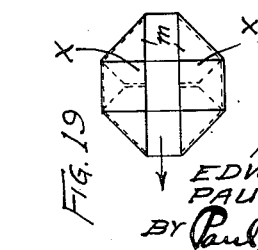
INVENTORS
EDWIN G. STAUDE
PAUL E. FISCHER
BY Paul, Paul & Moore
ATTORNEYS July 28, 1942.                E. G. STAUDE ET AL                2,291,063
                                BOX MAKING MACHINE
                              Filed Aug. 26, 1940            13 Sheets-Sheet 11
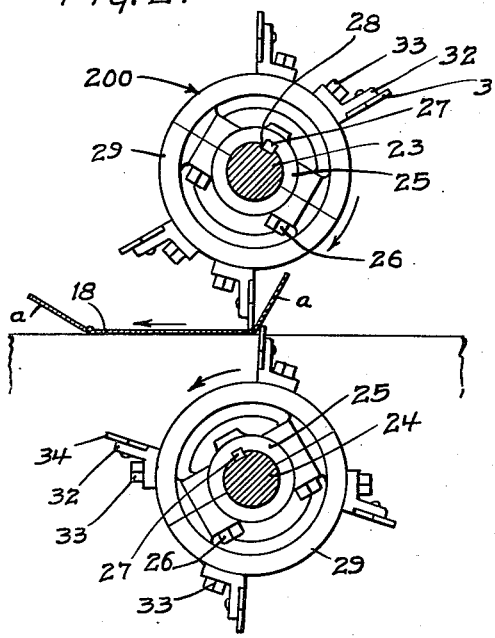
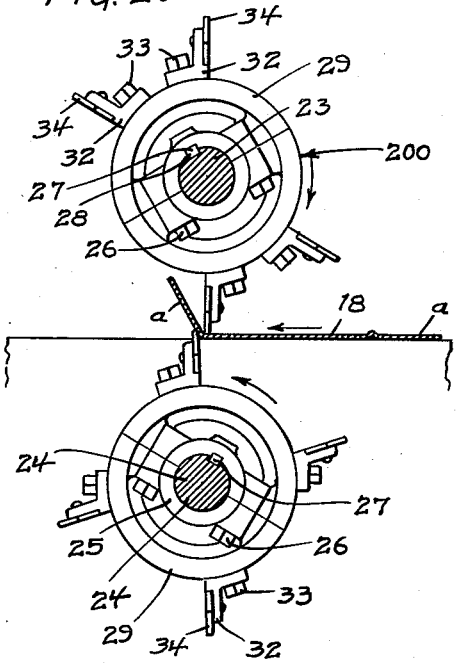
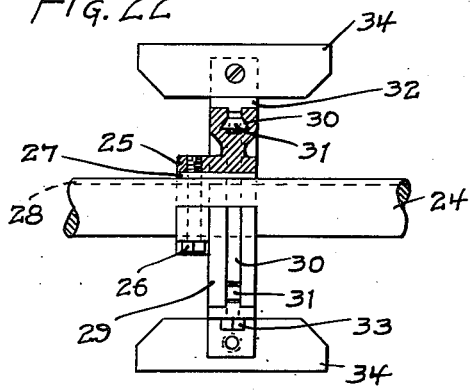
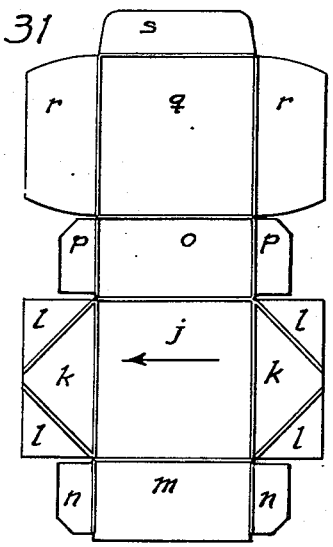
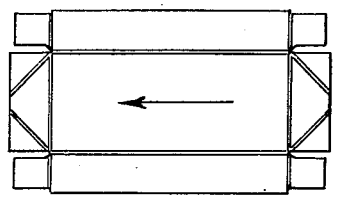
INVENTORS
EDWIN G. STAUDE
PAUL E. FISCHER
BY Paul, Paul & Moore
ATTORNEYS July 28, 1942.  E. G. STAUDE ET AL  2,291,063
BOX MAKING MACHINE
Filed Aug. 26, 1940   13 Sheets-Sheet 12

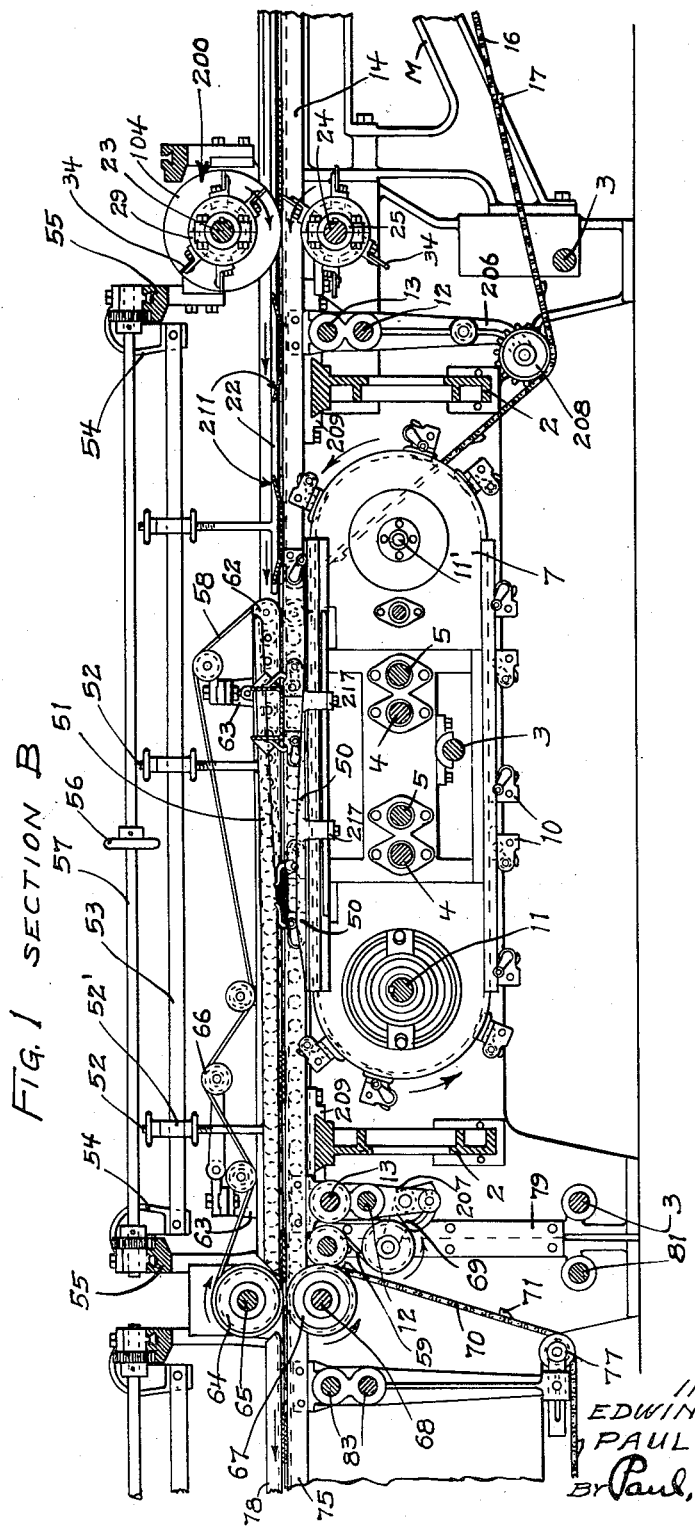

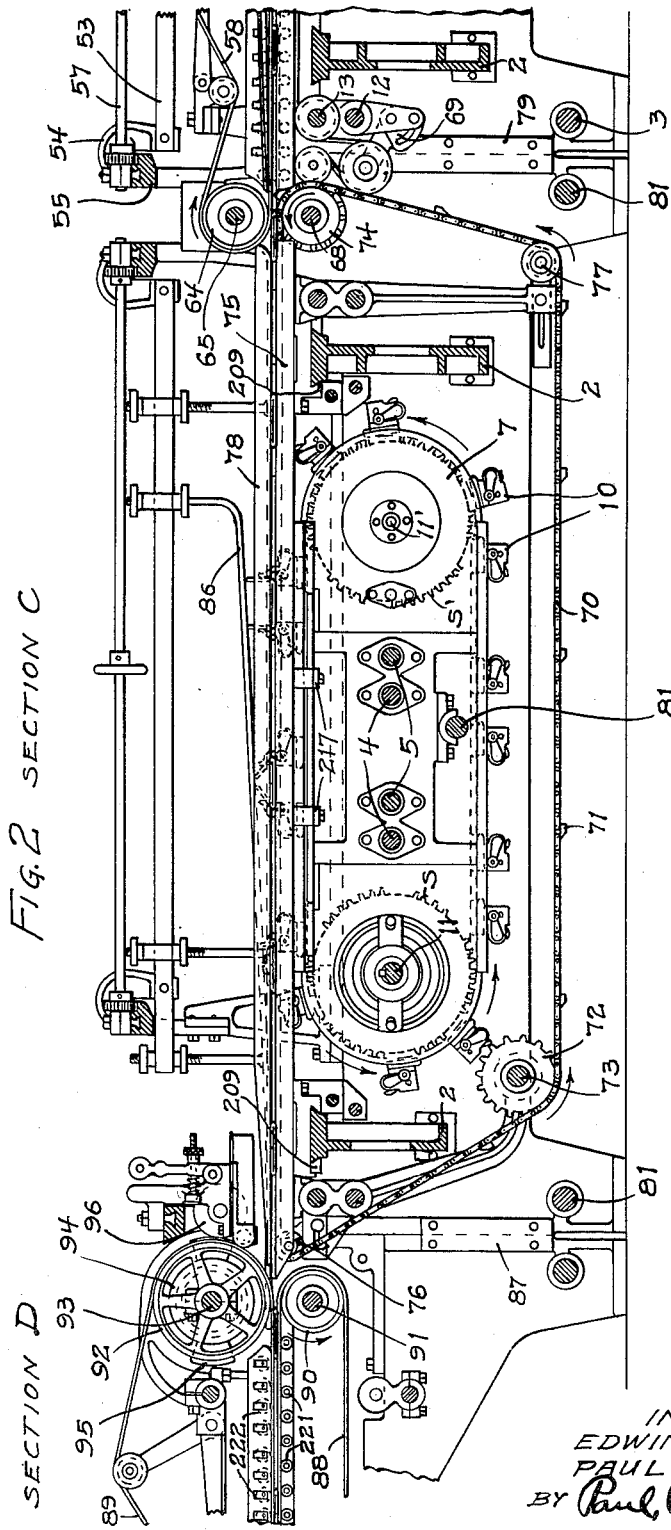

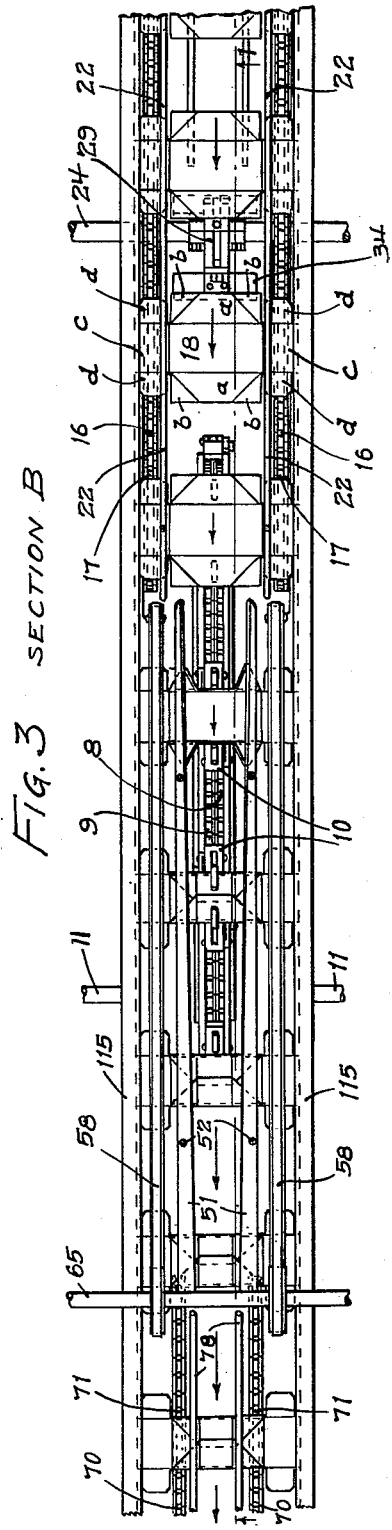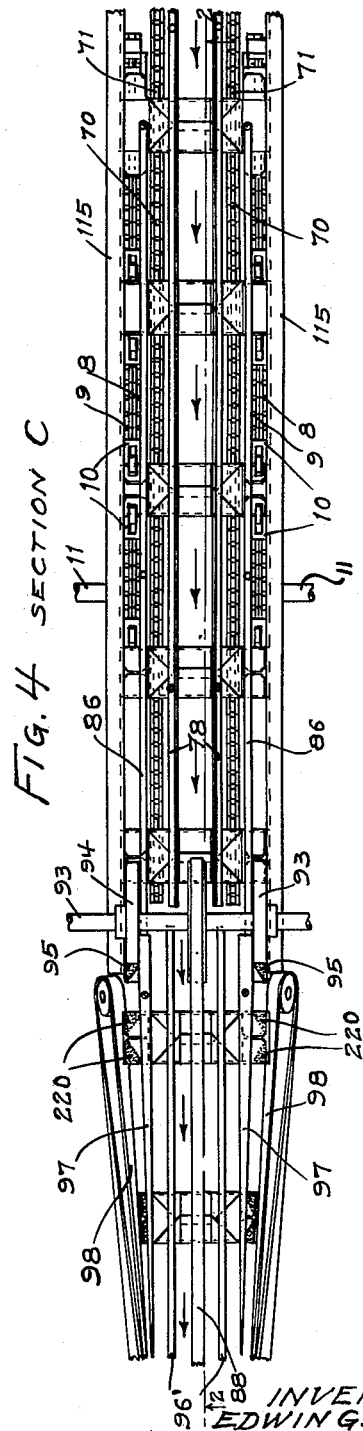

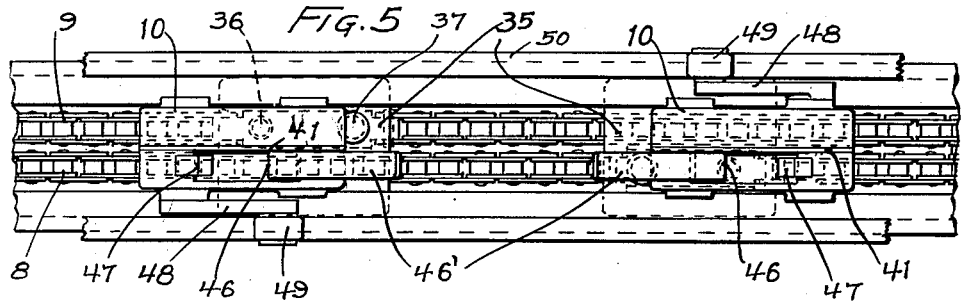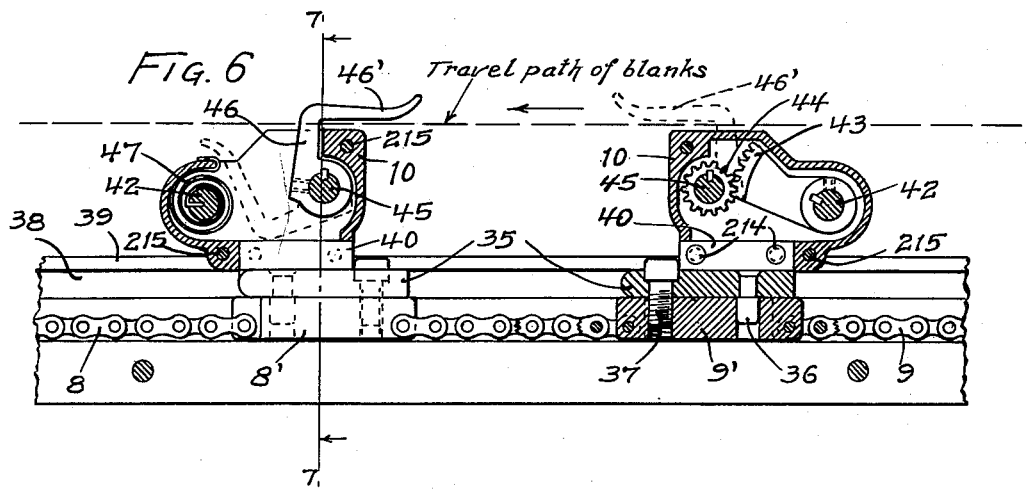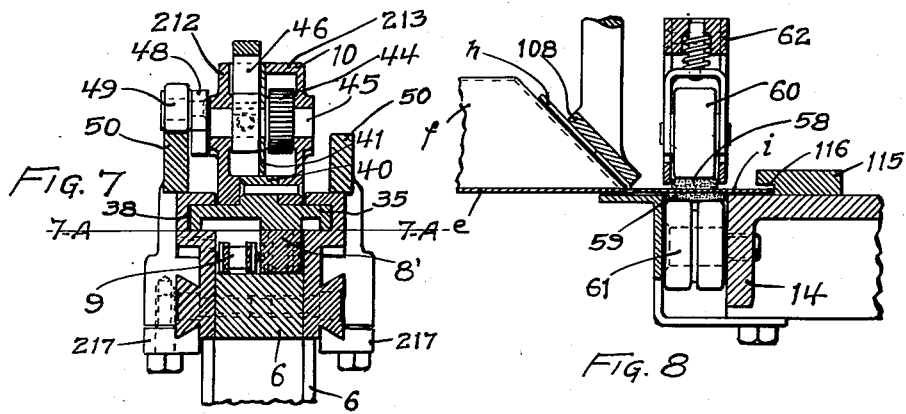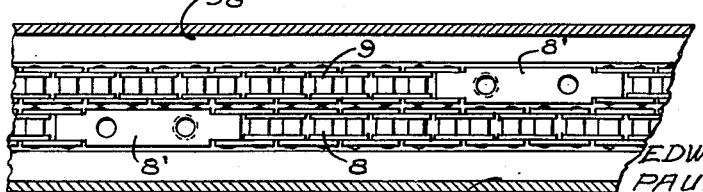

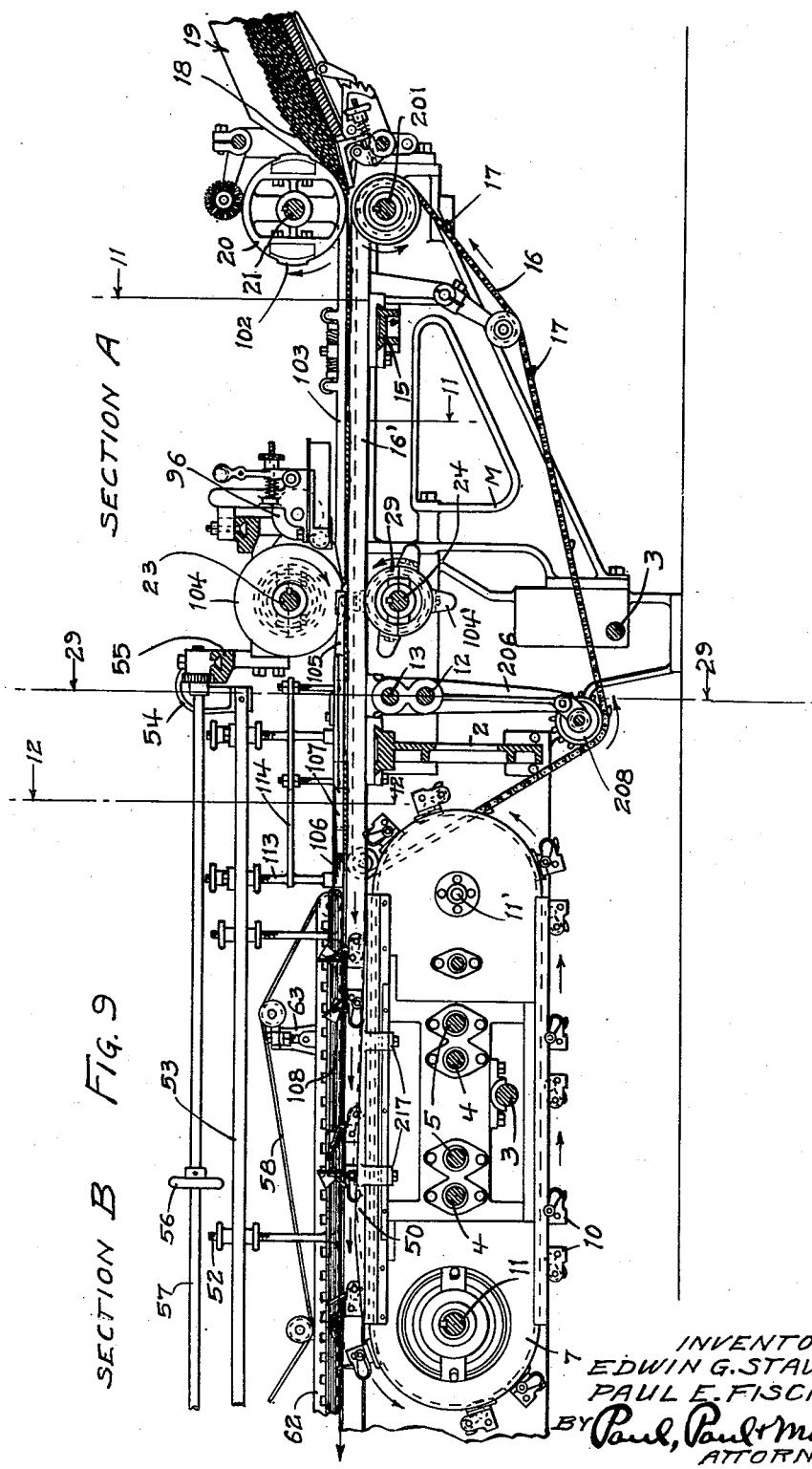

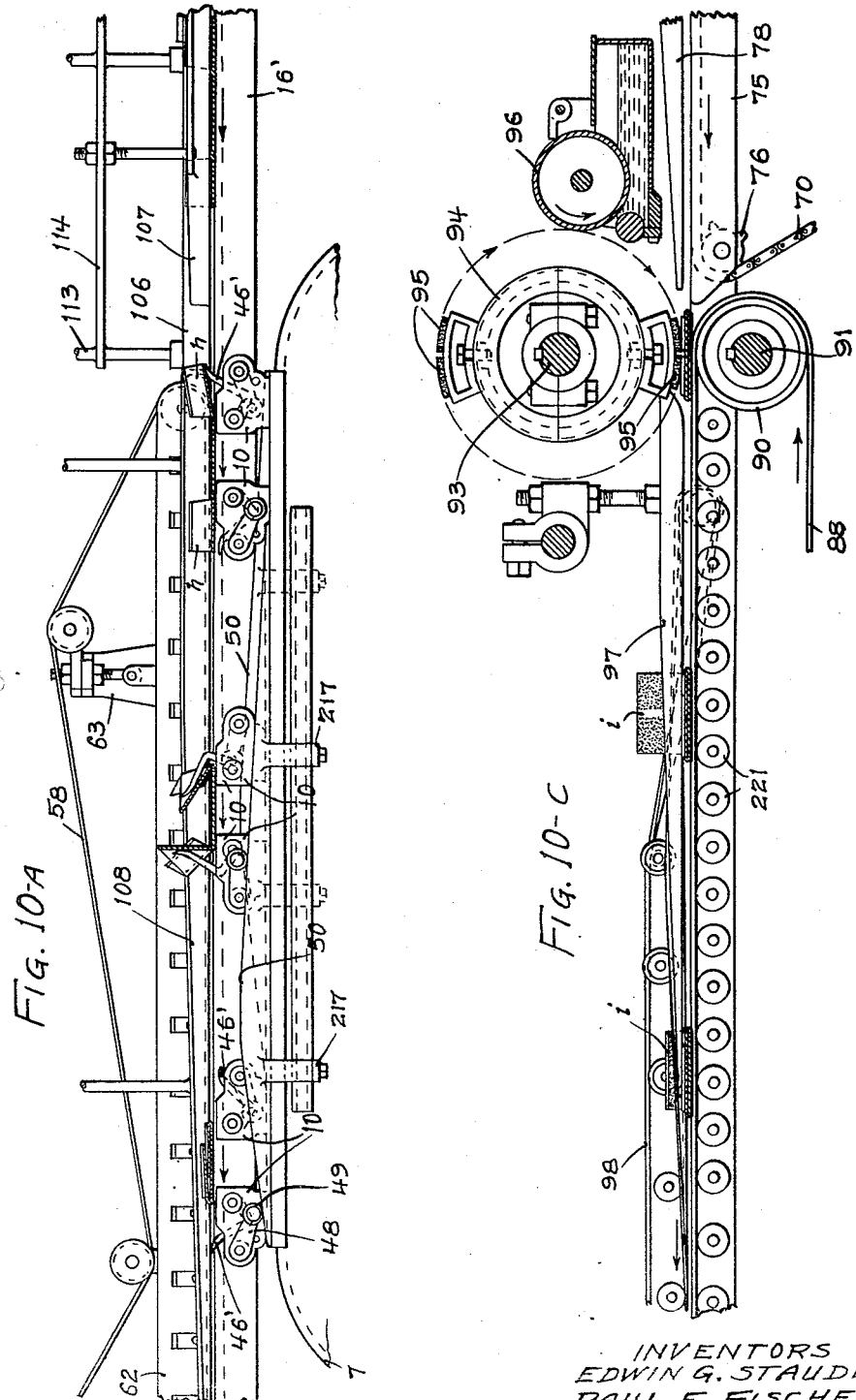

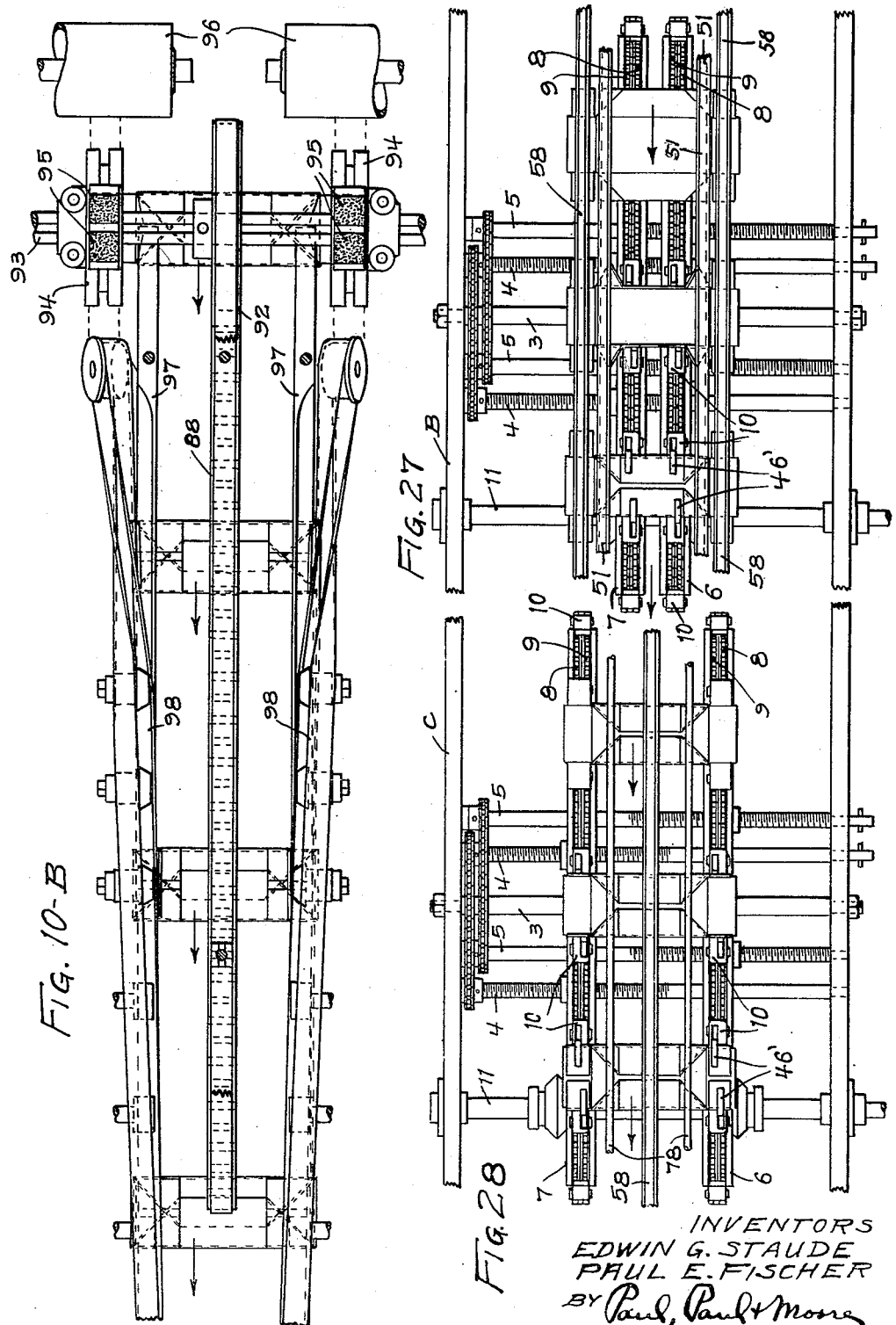

INVENTORS
EDWIN G. STAUDE
PAUL E. FISCHER
BY Paul, Paul + Moore
ATTORNEYS

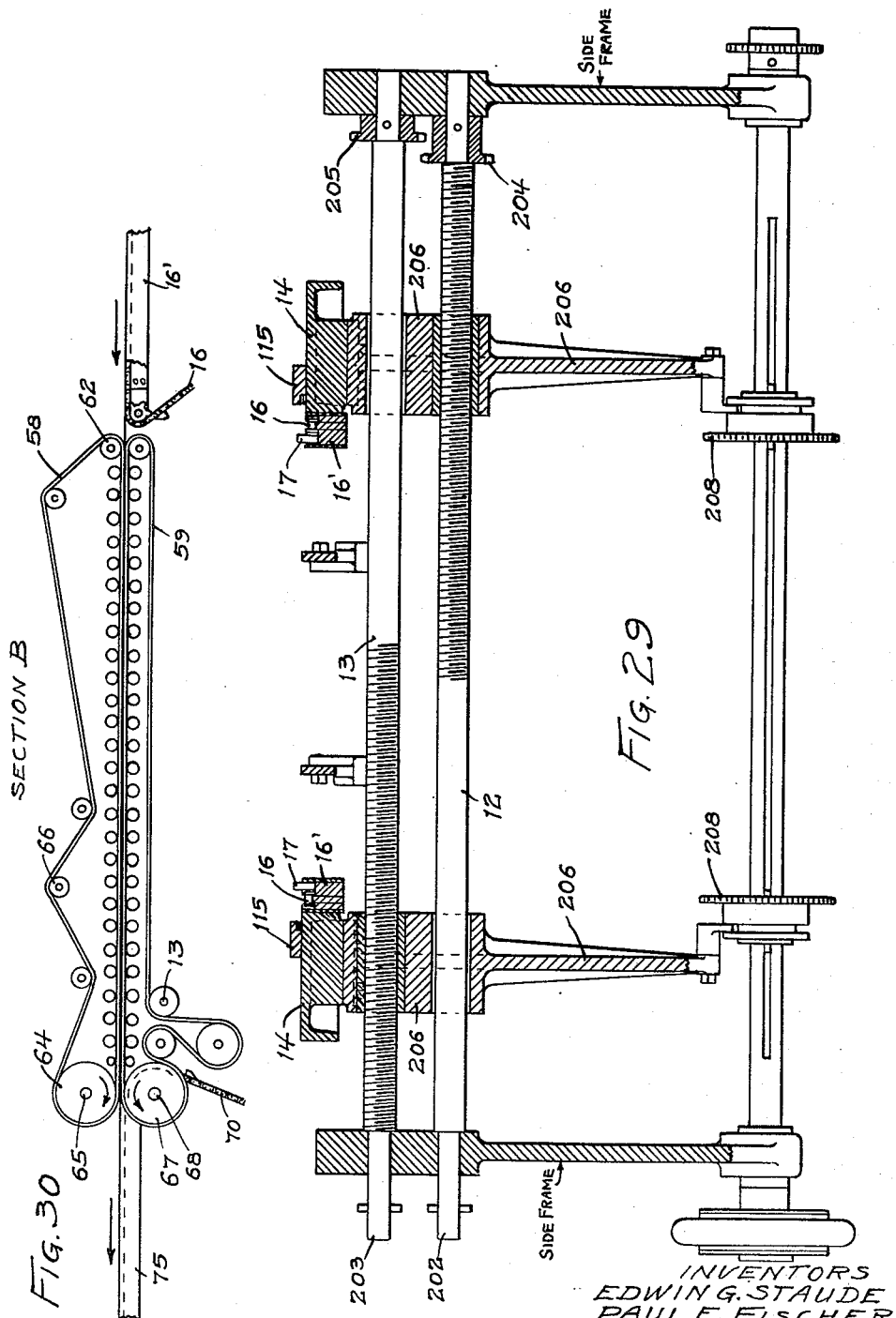

Patented July 28, 1942

2,291,063

UNITED STATES PATENT OFFICE 2,291,063

BOX MAKING MACHINE

Edwin G. Staude and Paul E. Fischer, St. Paul, Minn., assignors to E. G. Staude Manufacturing Company, St. Paul, Minn., a corporation of Minnesota Application August 26, 1940, Serial No. 354,264

19 Claims. (Cl. 93—49)

This invention relates to new and useful improvements in machine for making paper cartons of the type which are usually maintained in collapsed condition until they are to be used, thereby to facilitate shipment and storage, and which cartons are made from preformed blanks which may previously have been cut, creased, printed and otherwise treated, as may be required, before the blank is subjected to the various folding and gluing operations in the formation of the carton.

An object of the present invention is to provide a machine of the general character shown and described in my Patents No. 1,894,131 and No. 1,910,413, issued January 10, 1933, and May 23, 1933, respectively, having means whereby a much wider range of carton types may be folded and glued, and whereby the various adjustments required to change the machine from one type carton to another may readily and quickly be accomplished in a minimum of time. In these machines, the end portions of the side wall flaps of the blank, and the corner flaps extending from the ends thereof, are folded inwardly over the side wall flaps and the bottom panel of the blank in flatwise relation thereto, after which the end wall flaps of the blank are folded inwardly over the previously folded corner flaps and secured thereto, whereby the formation of the collapsed carton is completed. In the particular type of carton or box disclosed in the above noted patents, the side walls of the carton are disposed in the plane of the bottom wall of the carton, when the carton is collapsed, and the end walls are folded inwardly over the bottom wall in flatwise relation thereto. While Patent No. 1,910,413 does not specifically show a carton having its side walls folded inwardly over the bottom of the carton, it is obvious that the adjustable folding mechanisms therein shown may be so adjusted as to inwardly fold the side wall flaps of the blank over the bottom wall panel thereof.

Cartons formed as above described, are objectionable for use with some products, because the side walls of the cartons, when in operative positions, have a tendency to bulge outwardly as the result of the inherent tension in the blank along the crease lines where the blank is bent or folded, when the side walls are folded out of the plane of the bottom panel to erect or set up the box. Such outward bulging of the side walls may impair the general appearance of the box, when filled, and sometimes makes it difficult to apply a cover to the filled box, particularly in the larger size boxes. By folding the side and end wall flaps inwardly over the bottom panel of the blank and retaining them in such positions in the completed collapsed box, the tendency of the side walls to bulge outwardly is completely eliminated. When the walls are thus inwardly folded over the bottom, they may have a tendency to bulge inwardly, when the carton is unfolded and set up, but such inward bulging is usually not objectionable, because when the box is filled, the contents thereof will exert sufficient outward pressure on the upright walls of the box to hold them in perpendicular relation to the bottom of the box, whereby the filled box or package will present a much neater and more attractive appearance.

A further object of the invention is to provide a paper box machine of the class described in which the blanks are fed through the machine in substantially a straight path, which is an advantage over machines in which the blanks follow a right-angle path, because in a right-angle machine, there is some loss of time and efficiency incurred in transferring the blanks from one path to another, which is avoided in the straight path machine, and furthermore, machines of the latter type require less floor space, which is always desirable.

A further object is to provide a machine comprising a plurality of blank folding and gluing mechanisms which may readily and conveniently be adjusted or rearranged to adapt the machine for making a large variety of collapsible cartons, both as to type and size, whereby the utility of the machine is greatly increased.

A further object is to provide a machine of the character disclosed having means for positively feeding the blanks through the machine in accurately timed relation to the operation of the various folding mechanisms and devices, whereby the machine may be operated at a relatively higher speed than conventional machines of this general type, without danger of the blanks jamming in the machine, resulting in greater economy in the manufacture of collapsed cartons of the general type herein disclosed.

A further object is to provide a machine of the class described comprising a mechanism for pre-breaking the transverse creases in the blank to facilitate accurately folding the blank along said crease lines, when portions of the blank are engaged by the folding mechanisms.

A further object is to provide a box making machine comprising a plurality of gluing mechanisms which may readily be interchanged or rearranged to permit the application of adhesive to various portions of the blank or partially folded box walls between folding operations.

A further object is to provide a machine of the class described comprising means for raising the corner flaps to facilitate initially folding said inflaps inwardly over the side wall flaps.

Other objects of the invention reside in the provision of such a machine having means for simplifying the adjustments and timing of the various operating mechanisms; in the provision of a machine which is capable of making a wide variety of collapsible paper cartons, and which may also be used in the manufacture of various other articles made from sheet material as, for example, envelopes and mailing cartons; in the construction of the novel folder heads and the simplified drive therefor; and, in the provision of a box making machine which may be operated at high speed and which is substantially automatic in operation and requires very little care on the part of an attendant.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 1 is a longitudinal sectional view substantially on the line 1—1 of Figure 3, showing the means for inwardly folding opposite sides of a blank of the type shown in Figure 23;

Figure 2 is a longitudinal sectional view on the line 2—2 of Figure 4, showing the means for inwardly folding the extension flaps on the end wall portions of the blank;

Figure 3 is a plan view of Figure 1, with some of the parts omitted;

Figure 4 is a plan view of Figure 2, with some of the parts omitted;

Figure 5 is an enlarged plan view of a pair of the improved folder heads, showing the operating means therefor;

Figure 6 is a longitudinal sectional view of Figure 5, showing the general construction of the folder heads;

Figure 7 is a detail sectional view on the line 7—7 of Figure 6;

Figure 7A is a sectional plan view on the line 7A—7A of Figure 7;

Figure 8 is a detail sectional view on the line 8—8 of Figure 10, showing the spring-pressed belt runs which grip the end wall flaps of the blank and advance the blank, as the folder heads inwardly fold the side wall portions of the blank;

Figure 9 is a longitudinal sectional view of the receiving end of the machine, showing the means for successively delivering the blanks to the feeding and folding mechanisms;

Figure 10 is a plan view of a portion of Figure 9, on a larger scale, showing the machine adapted for folding blanks of the type shown in Figure 24;

Figure 10A is a longitudinal section on the line 10A—10A of Figure 10, with some of the parts omitted, showing the folder heads for inwardly folding the side wall portions of the blank over the bottom wall portion thereof;

Figure 10B is a plan view of Figure 10C;

Figure 10C is a longitudinal sectional view of Figure 10B;

Figure 11 is a cross-sectional view on the line 11—11 of Figure 9, on an enlarged scale, showing the means for engaging and partially inwardly folding the extension flaps of the side wall portions of a blank of the type shown in Figure 24;

Figure 12 is a cross-sectional view on the line 12—12 of Figure 9, showing the stationary folders for further inwardly folding the side wall extension flaps;

Figure 13 is a partial plan view of Figure 9, showing the traveling folding mechanism adjusted for making boxes of the type shown in Figure 23, but wherein the blank has an extension at one end adapted to provide a cover for the box;

Figure 14 is a view similar to Figure 13, showing the blanks advanced from the position shown in Figure 13;

Figure 15 is a view showing a box of the type illustrated in Figure 14, completed, with the exception of the final fold, the shaded portions indicating the gummed areas;

Figure 16 is a view showing the box illustrated in Figure 15, completed and collapsed;

Figure 17 is a partial plan view of the machine with the folding mechanisms arranged to operate on a blank for a box of different shape from the one shown in Figures 15 and 16;

Figure 18 is a view illustrating the box in Figure 17 partially completed;

Figure 19 is a view showing the box illustrated in Figure 18 completed and collapsed;

Figure 20 is an enlarged detail view showing the means for pre-breaking the crease at the juncture between the leading side wall and bottom of the box;

Figure 21 is a view similar to Figure 20, but showing the means for pre-breaking the crease between the following or rear side wall and bottom of the box;

Figure 22 is a detail view of one of the creasing members showing the means for circumferentially adjusting the pre-breaking blades on their supporting means;

Figure 27 is a plan view of a portion of section B, showing the folding mechanisms adjusted for inwardly folding the side wall flaps of a blank of the general type illustrated in Figure 23, but wherein the box is relatively longer than the one shown in Figure 23, thereby necessitating two sets of folder heads;

Figure 28 is a plan view of a portion of section C, showing the folder heads in said section positioned to inwardly fold the corner flaps of the box shown in Figure 27;

Figure 29 is a cross-sectional view on the line 29—29 of Figure 9, showing the means for laterally adjusting the platforms;

Figure 30 is a diagrammatic view showing the co-acting conveyer belts for feeding the blanks from the conveyer chains 16 of section B to the feed chains 70 of section C;

Figure 31 is a view showing a blank of the general type illustrated in Figures 25 and 26, but which differs slightly in construction; and Figure 32 is a view showing a box of the general type illustrated in Figure 23, but which is relatively longer in the direction of travel through the machine.

Figure 23:
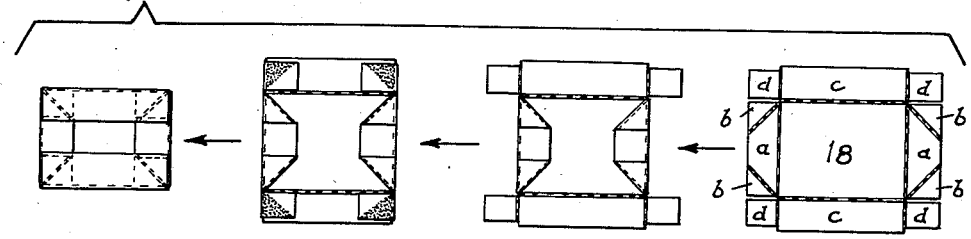
Figure 23 is a view showing a blank and the various steps of folding and gluing said blank to provide a certain type of collapsible box.

The novel machine herein disclosed is shown comprising four sections suitably connected together in longitudinal alinement and identified by the reference characters A, B, C, and D. Section A is the feeder section which delivers the blanks to section B in accurately spaced relation. Section B performs the initial folding operations on the blank, after which they are successively delivered to section C where additional folds are made in the flaps of the blank. From section C, the blanks are delivered to section D, where predetermined areas of each blank are gummed and the final folding operations performed to complete the formation of the collapsible blank.

The general construction of the machine herein disclosed and the manner of transmitting power to its various mechanisms, is quite similar to that shown and described in Patent No. 1,910,413, and we therefore do not consider it necessary to herein show and describe in detail the exterior structure of the machine, the present application being directed more specifically to the mechanisms which directly engage the carton blanks.

The parts of the present machine which are quite similar to the corresponding parts of the machine shown in the above mentioned patent include the main side frame members, connected together by suitable cross members 2 and tie rods 3; the screw threaded adjusting shafts 4—4 and 5—5, and the casings 6 and 7, which are laterally adjustable with respect to one another by manipulation of the adjusting shafts 4—4 and 5—5, by the application thereto of a suitable crank, not shown. Both sections B and C are provided with casings 6 and 7 and adjusting shafts 4—4 and 5—5, as shown in Figures 2 and 9.

One end of each casing 6 and 7 is supported on a driven cross shaft 11, and a pair of suitable sprockets S are mounted on the shaft 11 within each casing. The sprockets S are slidable on the shaft 11, together with the casings 6 and 7, and are splined thereto to prevent them from relatively rotating thereon, as will be understood by reference to Figures 1 and 2. Similar sprockets S' are rotatably mounted on a fixed stub shaft 11', provided at the opposite end of the casing members 6 and 7. Suitable endless chains or belts 8 and 9 are mounted on the sprockets S and S' in closely spaced relation as shown, for example, in Figures 3 and 12, and each carries a plurality of folder heads, generally designated by the numeral 10.

The adjusting shafts 4—4 and 5—5 are suitably supported in the side members of the machine frame, and provide means for conveniently varying the lateral spacing between the casings 6 and 7 and the folder heads 10 carried by the endless belts 8 and 9 therein, in accordance with the size of the blank to be operated upon.

As best shown in Figures 1 and 9, the feeder section A comprises a pair of extension brackets M, shown bolted to the adjacent ends of the side frame members of section B and extend outwardly therefrom. A suitable cross member 15 is interposed between and secured to the brackets M adjacent their outer ends and provides a support for the adjacent ends of a pair of spaced parallel chain guides 16'. The chain guides 16' are also supported on the cross frame members 2 of sections B and C, and are adjustable crosswise of the machine to adapt the machine for blanks of different sizes, as indicated in dotted lines in Figure 12. A pair of conveyer chains 16 have their upper runs supported in the guides 16', and each chain 16 has a plurality of spaced feed lugs 17 interposed therein adapted to engage the rear edges of the blanks 18, as will subsequently be described. The conveyer chains 16 are supported on a plurality of sprockets, as best shown in Figure 9, and extend through section A and terminate at the near ends of the folder head chains 8 and 9 in section B. The chains 16 may be driven from the shaft 201, shown at the right hand end of Figure 9.

Means is provided on section A for successively feeding the blanks to the conveyer chains 16, and is shown comprising a suitable hopper, generally designated by the numeral 19, adapted to support a plurality of blanks 18, as shown in Figure 9. A suitable feed wheel 20 is provided adjacent to the hopper 19, and has rubber pads 102 on its periphery adapted to engage and eject the blanks from the hopper onto the upper runs of the conveyer chains 16, supported in the guides 16'. The blanks are delivered to the conveyer chains 16 in spaced relation, after which the lugs 17 of the chains engage the rear edges of the blanks and advance them through the machine in the direction indicated by the arrow in Figure 9. The ends of the blanks pass beneath suitable spring-actuated hold-down bars 103, disposed over the upper runs of the conveyer chains 16, and which serve to hold the blanks in feeding contact with the lugs 17, as clearly illustrated in Figure 11.

A pair of longitudinal platforms or rails 14 extend from the feed wheel 20 on section A, through sections B and C and terminate adjacent to the gluing mechanism, located on section D. These platforms are best illustrated in Figures 8, 10 and 28, and are preferably channel-shaped in cross section. For convenience in manufacture, they are preferably made in sections, one section extending from the feed wheel 20 to the adjacent end of section B, the intermediate section being substantially the length of section B, and the third section extending from the intermediate section at B to the gluing mechanism.

The platforms of sections A and B are preferably secured together by suitable means, not shown, and are supported on threaded adjusting shafts or rods 12 and 13, as shown in Figures 1 and 29. The terminals of the adjusting shafts 12 and 13 are supported in suitable bearings provided in the side frame members of section B, and are adapted to be manually rotated by the application of a suitable crank to the projecting terminals 202 and 203 thereof, shown in Figure 29. The shafts 12 are suitably connected together by a chain drive, indicated at 204 in Figure 29, and the shafts 13 are similarly connected together by a chain drive 205. By thus connecting together shafts 12 and 12, both ends of the platform 14 at the right hand side of Figure 29 will be laterally adjusted with respect to the longitudinal centerline of the machine, when the shafts 12—12 are rotated and, in like manner, the platform 14 at the left hand side of Figure 29 may be laterally adjusted by rotation of shafts 12—13. The intermediate platforms 14 of section B are secured to the upper ends of suitable brackets 206 and 207, received in threaded engagement with the shafts 12 and 13. The lower runs of the conveyer chains 16 are supported on idler sprockets 208 supported in the lower ends of the brackets 206. The platforms 14 of section C are supported on the cross members 2 of the main frame and are adjustable thereon by suitable clamping devices, generally indicated by the numeral 209.

The platforms 14 are adapted to support the end wall flaps of the blanks, as shown in Figures 3, 8, and 12, and are provided with suitable guides 115 provided with slotted brackets 115' adapted to be adjustably secured to the platforms 14 by suitable clamping screws 117 having their threaded terminals received in threaded engagement with lugs 116 provided on the platforms 14. The guides 115 are longitudinally recessed, as shown at 116 in Figures 8 and 12, to receive the laterally projecting terminals of the blanks.

To simplify the explanation of inwardly folding the flaps over the bottom wall panel of the blank, the leading and trailing flaps of the blank, regardless of the shape or size of the carton to be formed, will hereinafter be referred to as the side wall flaps, and the flaps which extend outwardly from the blank in a direction transverse to the direction of travel of the blank, will be referred to as the end wall flaps, and the small flaps extending from the ends of the side and end wall flaps will be referred to as the corner flaps. We, therefore, wish it understood that the term "side wall flaps," as herein used, does not necessarily mean those portions of the blank which, in the finished box, are usually referred to as the side walls, but in some types of blanks, may actually refer to the portions of the blanks which, in the finished box, will constitute the end walls thereof as shown, for example, in Figure 32, wherein the arrow indicates the direction of travel of the blank through the machine.

An important feature of the present invention resides in the means for pre-breaking or bending the blanks along the fold lines or creases along which the side wall flaps a—a of each blank are upwardly folded in the operation of forming the side walls of the carton, and whereby the operation of inwardly folding said side wall flaps is greatly facilitated. The means provided for thus abruptly pre-bending the side wall flaps transversely to the direction of travel of the blanks is, therefore, an important feature of the invention, in that it greatly facilitates the final folding of the blank along these creases or fold lines by the short folding fingers of the traveling folder heads 10, subsequently to be described.

The means provided for thus pre-bending the side wall flaps a—a of the blank is best shown in Figures 1, 20, 21, and 22, and comprises vertically spaced driven shafts 23 and 24, upon which the pre-bending devices, generally designated by the numeral 200, are adjustably mounted. One pre-bending device is mounted on each shaft, and as these devices are similar in construction, but one will be described in detail. Each device comprises a split hub 25 which is clamped to its respective shaft by suitable bolts 26. The hub 25 is adapted for axial adjustment on the shaft, and to prevent relative rotation of the hub 25 on the shaft, a suitable key 27 is secured in the bore thereof and is slidable in a suitable key way 28 provided in the shaft. The hub has an annular flange 29 which is provided with an annular groove 30 in which threaded wedge-shaped elements or nuts 31 are loosely fitted.

Angle brackets 32 are fitted to the periphery of the flange 29 and are adjustably secured thereto by screws or bolts 33, having their threaded terminals received in threaded engagement with the nuts 31, whereby the angle brackets may be secured in fixed relation to the periphery of the flange 29. The brackets 32, it will be noted by reference to Figures 20 and 21, are arranged in pairs, and the brackets of each pair are oppositely disposed. An elongated blade 34 is secured to each bracket 32, and these paddles are radially disposed with respect to the axis of the flange 29. The pre-bending devices 200 operate in timed relation to the travel of the blanks through the machine, and the blades 34 thereof are so adjusted on the peripheries of their respective flanges 29, that the blades of one pre-bending device will co-act with the blades of the other pre-bending device and upwardly bend the side wall flaps of the blank, first the leading flap and then the trailing flap, as clearly illustrated in Figures 20 and 21. In other words, the co-acting blades 34 of the upper and lower pre-bending devices 200 slightly overlap each other, but do not directly contact one another, whereby the side wall flaps of the blanks may be received therebetween as the blanks pass between the pre-bending devices, resulting in said flaps being bent abruptly upwardly along the creases connecting them to the body of the blank. The blades 34 travel in the direction of the blank, when they engage the side wall flaps thereof, whereby the side wall flaps are bent upwardly without interrupting the traveling movement of the blanks.

The brackets 32 which support the blades 34 are circumferentially adjustable on the periphery of the flange 29, whereby they may readily and conveniently be adjusted for boxes of different sizes. After the blanks have passed through the pre-bending devices 200, the side wall flaps of the blank will be partially turned up, as shown at 211 in Figure 1. The blanks are then advanced into feeding engagement with the adjacent runs of a pair of conveyer belts 58 and 59, diagrammatically shown in Figure 30, which operate in timed relation to the movement of the folder heads 10, which then easily complete the side flap folding operation which was initially started by the pre-bending devices, as above described.

The folder heads 10, as best shown in Figures 5, 6, and 7, are arranged in oppositely disposed pairs, and each comprises a suitable block 8', inserted at equally spaced intervals in the folder head chains 8 and 9, in a manner similar to the folder heads disclosed in Patent No. 1,910,413.

The novel folder heads herein disclosed distinguish from the folder heads shown in the above mentioned patent, in that they are simpler in construction and operate directly in line with the direction of travel of the blanks, and are adapted to operate successively on diagonal fold blanks. As all of the folder heads herein disclosed are alike in construction, but one will be described in detail. Each folder head comprises a slide 35 detachably secured to a link block 8' by a suitable dowel pin 36 and cap screw 37. The opposite edges of the slide 35 are received in longitudinally extending guide ways 38 provided in the upper portions of the casings 6 and 7.

Each folder head 10 comprises a split housing composed of two members 212 and 213, the latter being shown permanently secured to an upright flange 40 provided on the slide 35 by suitable rivets 214. The other member 212 of the housing is removably secured to the fixed housing member 213 by suitable screws or bolts 215, shown in Figure 6. The interior of the housing is divided into two chambers by a suitable partition 41, the contour of which coincides substantially with the contour of the housing members 212 and 213, when viewed as shown in Figures 6 and 7. The partition 41 is clamped between the two housing members, as will readily be understood by reference to Figures 5 and 7. A rock shaft 42 is shown mounted in suitable bearings provided in the housing members 212 and 213, and carries a gear segment 43 which meshes with a pinion 44 secured to a short shaft 45, mounted in the housing members in a manner similar to the rock shaft 42. The shaft 45 has an arm 46 secured thereto which projects through an opening in the upper portion of the housing and is provided with an offset finger 46', adapted to engage one of the side wall flaps of the blank and inwardly fold it over the bottom panel 18 thereof. The partition 41 cooperates with the housing member 213 to provide a closed chamber for the gear segment 43 and pinion 44.

The means provided for operating the rock shaft 42 is best shown in Figures 5, 7, and 10A, and comprises an arm 48 having one end secured to the shaft 42 and its opposite end provided with a suitable roller 49. The roller 49 of the co-acting folder heads of each pair of chains 8 and 9, are adapted to engage a pair of longitudinally disposed cam bars 50, adjustably secured to the upper portions of the housing 6 by suitable clamping elements 217, as shown in Figure 7. By reference to Figures 7 and 10A, it will be noted that the cam bars 50 may be longitudinally adjusted with respect to the housing 6, thereby to time the operation of the folder fingers of each pair of folder heads 10 with respect to the traveling movement of the blanks through the machine. Suitable springs 47 are preferably provided in the housings 10 for constantly urging the shafts 42 in a direction to hold their respective rollers 49 in engagement with the cam bars 50.

As hereinbefore stated, two endless conveyer chains or belts 8 and 9 are provided in each housing 6 and 7, and each is provided with a plurality of folder heads 10, as shown in Figures 6 and 10A. The two chains are arranged in closely spaced relation and the folder heads on one chain are oppositely disposed with respect to the folder heads on the other chain, as best shown in Figure 6. The sprockets S and S' which support the two chains in each housing, are rotatively adjustable with respect to one another to vary the spacing between the adjacent heads of each pair of folder heads to correspond to the size of the blanks to be operated upon.

The folder heads are positioned beneath the path of travel of the blanks, as shown in Figure 6, and the folder fingers thereof are normally retained in the dotted line position shown at the left hand side of Figure 6, out of the path of the blanks. The conveyer belts 58 and 59 receive the blanks from the conveyer chains 16 and feed them through section B, while the folder fingers 46' engage and inwardly fold the opposed side wall flaps of the blank, as clearly illustrated in Figures 3 and 10A. The folder fingers of each pair of folder heads are preferably so timed that the trailing end wall flap of each blank is folded inwardly over the bottom panel of the blank before the leading side wall flap, as shown in Figure 10A. By thus folding the leading end wall flap over the trailing end wall flap, there is less danger of the inwardly folded flaps to interfere with other parts of the machine as the partially folded blanks are advanced through the machine.

When the machine is adjusted for operating on blanks of the type shown in Figures 1 and 3, the belts 58 and 59 are adjusted to engage only the end and corner flaps $c$ and $d$, as clearly illustrated in Figure 3. In making boxes from blanks of this type, the folder heads 10 in section C are also utilized, as shown in Figure 4. The folder fingers of the heads 10 in section C engage and inwardly fold the corner flaps $d$ over their respective end wall flaps $c$, after the side wall flaps $a$ have previously been inwardly folded over the bottom panel 18 of the blank by the folder fingers 46' in section B.

Another important feature of the present invention resides in the means provided for folding the corner portions $b$ of the side wall flaps $a$ along diagonal fold lines, simultaneously as the side wall flaps $a$ are folded inwardly over the bottom wall panel 18 of the blank. The means provided for thus reversely folding the corner portions $b$ of the side wall flaps $a$, is best shown in Figure 3, and comprises a pair of longitudinally extending folder bars 51, shown disposed over the outer end portions of the side wall flaps $a$, as shown in Figures 1 and 3, whereby when the side wall flaps are upwardly folded by the folder fingers 46', the corners $b$ of the side wall flaps $a$ will engage the folder bars 51. The folder bars 51 are oppositely twisted or, in other words, each is partially twisted to provide a spiral, whereby as the blank advances along the length of said bars, the corner flaps are gradually folded downwardly into flatwise relation to their respective side wall flaps $a$, as the latter are folded into flatwise relation to the bottom panel of the blank. In this condition, the blank is delivered to the conveyer chains 70 in section C which, like the conveyer chains 16 in section A, are provided with feed lugs 71 which engage the rear edge of the blank and feeds it through section C beneath a pair of hold-down bars 78. These bars firmly hold the inwardly folded side wall flaps and the corners thereof in flatwise relation to the bottom panel 18 of the blank, as shown at the left hand side of Figure 3, as the blank advances through section C. As the partially folded blank advances through section C, the folder fingers of the folder heads of said section engage and inwardly fold the corner flaps $d$ of the blank, over their respective end wall flaps $c$, as clearly illustrated in Figure 4. In this condition, the blank is delivered to section D, where predetermined areas of the blank are gummed, as indicated by the numerals 220 in Figure 4.

In passing from section C to section D, the side wall flaps $a$, including the outwardly turned corner portions $b$ are retained in folded position by the hold-down bars 78, while the corner flaps $d$ are retained in folded position by suitable hold-down bars 86, shown in Figures 2 and 4.

Section D is shown provided with a pair of vertically disposed belts 88 and 89, mounted on pulleys 90 and 92 secured to vertically spaced shafts 91 and 93, respectively. The adjacent runs of the belts 88 and 89 are shown supported by suitable supporting rollers 221 and 222 which hold the belts in contact with the folded blanks with sufficient pressure to retain the flaps in flatwise relation to the bottom panel of the blank.

The glue mechanism is shown comprising a glue transfer wheel 94 mounted on the shaft 93 and having glue pads 95 which contact the surface of a glue wheel or drum 96, whereby a thin film of liquid glue is transferred to the folded corner flaps d, when the folded blanks pass beneath the transfer wheel 94. The glue mechanism may be adjusted to apply the glue to any desired portion of the blanks.

The partially folded gummed blanks are then advanced by the co-acting belts 88 and 89, while suitable hold-down bars 96' retain the flaps a and b in flatwise relation to the bottom panel of the blank. As the folded blanks are thus advanced through section D, tapered hold-down bars 97 hold down the glue-coated corner flaps d, while a pair of twisted belt runs 98 engage and inwardly turn the end flaps c and glue-coated corner flaps d over the inwardly folded side wall flaps a, thereby to complete the formation of the box. The completed collapsed box is then delivered to a suitable receiving means, not shown, such as a pair of co-acting pressure belts which hold the gummed flaps in bonding contact with one another until the gum has thoroughly set, as is customary in machines of this type.

Figure 24:
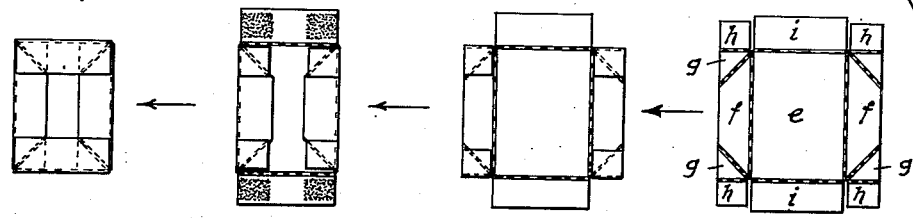
Figure 24 is a view showing a blank for a box of the general type illustrated in Figure 23, but of slightly different construction.

Figures 9, 10, and 11 show the machine adjusted for operating on blanks of the type illustrated in Figure 24. When blanks of this type are to be folded, the breaker blades 34 are preferably dispensed with and in lieu thereof, suitable disks 104 are secured to the upper shaft 23, shown in section A, and a plurality of outwardly projecting elements or ears 104' are secured to the peripheries of the flanges 29 of the hubs 25, shown supporting the pre-bending blades 34 in Figures 20 and 21. The disks 104 are positioned to engage the outwardly projecting end wall flaps i of the blank e, as best shown in Figure 11. The flanges 29 mounted on the lower shaft 24 are so positioned with respect to the chain guides 16' that the outwardly projecting elements or ears 104' thereof will engage each corner flap d, as the blanks advance through the machine in the direction indicated by the arrows in Figure 24.

By reference to Figure 11, it will be noted that the ears 104' are spaced inwardly from their complemental disks 104, and the terminals of the ears 104' extend above the path of travel of the blanks. By thus arranging the ears 104' and the disks 104, the ears 104' will engage the corner flaps d and upwardly bend them, as clearly illustrated in Figure 11. The hold-down bars 103 engage the bottom panel of the blank adjacent to the fold lines between the end wall flaps and the bottom panel, whereby only the corner flaps are bent upwardly by the ears 104'. The purpose in thus partially upwardly bending the corner flaps of the blank is to separate these flaps from the end wall flaps i, whereby a pair of pointed sword-like folding elements 105 may enter between the partially up-turned corner flaps h and the end wall flaps i, as shown in Figure 10. The sword-like folding bars or members are pivotally connected to a pair of spiral folder bars 106 which form, in effect, continuations of the sword-like folders 105.

Suitable hold-down bars 107 extend from the ends of the hold-down bars 103 to the folder bars 106 and hold the blanks in feeding engagement with the lugs 17 of the conveyer chains 16 until the blank is fed into feeding engagement with the co-acting belts 58 and 59. The folder bars 106 inwardly fold the corner flaps h over the end wall flaps f as the blank advances from the position shown at the right hand side of Figure 10, until the blank moves out of engagement with the folder bars 106 and into engagement with a pair of hold-down bars 108 which, in effect, form continuations of the folder bars 106.

When the corner flaps h move into engagement with the hold-down bars 108, the folder fingers 46' engage the side wall flaps f and inwardly fold them, first, the trailing side wall flap, and then the leading side wall flaps, as clearly illustrated in Figure 10. As the side wall flaps f are thus inwardly folded, the hold-down bars 108 will cause the end portions of the side wall flaps to fold along diagonal fold lines, whereby the corner flaps h will be positioned on top of the inwardly folded side wall flaps, when the latter have been folded into flatwise relation to the bottom panel e of the blank. When the length of the bottom panel of the blank is relatively short in a direction transverse to the travel of the blank through the machine, a single set of folder head chains 8 and 9 may be utilized for inwardly folding the side wall flaps, as shown in Figure 10. When only one such set of folder heads is used, one of the casings 6 with its endless chains 8 and 9 may be moved to an out-of-the-way position beneath one of the longitudinally extending side rails or platforms 14, as shown in Figure 12. When one of the casings 6 is thus positioned, its folder heads 10 may be removed from the chains thereof.

When the two side wall flaps f of the blank, shown in Figure 10, have been folded into flatwise relation to the bottom wall of the blank, as above described, the blank passes through the gumming mechanism where predetermined areas thereof are gummed and the end wall flaps folded inwardly over the exposed corner portions g of the side wall flaps by a suitable mechanism, such as illustrated in Figure 10B, whereby the formation of the collapsed box is completed.

In Figures 13 and 14, the machine is shown adjusted for folding a blank of the type shown in Figure 31, which comprises a bottom wall panel j having side wall flaps k, an end wall flap m having corner flaps n—n, an end wall section having corner flaps p—p and to which a cover panel or section q is attached. The cover panel q is provided with side wall flaps r and an end wall flap s. When operating on such a blank, the folder head casings in section B are positioned to engage and inwardly fold the side wall flaps k and r into flatwise relation to the panels j and q, respectively, after which the blank advances to section C beneath the hold-down bars 78 which engage and hold the inwardly folded flaps against the panels j and q of the blank. In section C, the folder heads 10 are positioned to engage the corner flaps n—n and p—p and similarly inwardly fold them over their respective portions m and o. From section C, the partially completed carton is delivered to the gluing mechanism, where portions thereof are gummed. The partially folded gummed blank then passes through a suitable mechanism for completing the final folds in the blank.

Figure 17 shows the machine adjusted to fold blanks of the outfold type wherein only corner portions of the side wall flaps are inwardly folded over portions of the side wall flaps and the bottom panel of the blank. In such boxes, the major portions of the side wall flaps remain in the plane of the bottom wall panel in the completed carton, as clearly shown in Figures 18 and 19.

In the formation of a box of this type, the corner flaps v and the triangular portions w are folded inwardly over a portion of the side wall panels t and the bottom panel u, along diagonal fold lines, to the positions shown at the left hand side of Figure 17, after which gum is applied to said partially folded flaps and the end wall flaps folded inwardly over the portions v—w, as shown in Figure 19.

Figure 25:
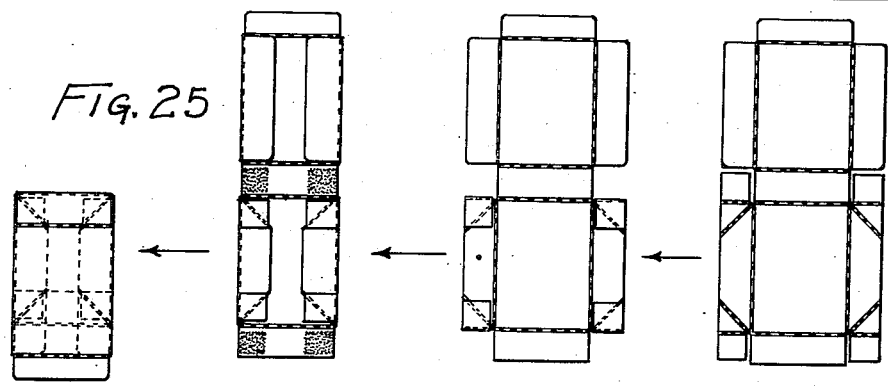
Figure 25 is a view showing a blank having a cover extension at one end, and also showing the various steps of folding and gluing the blank to complete the box.
Figure 26:
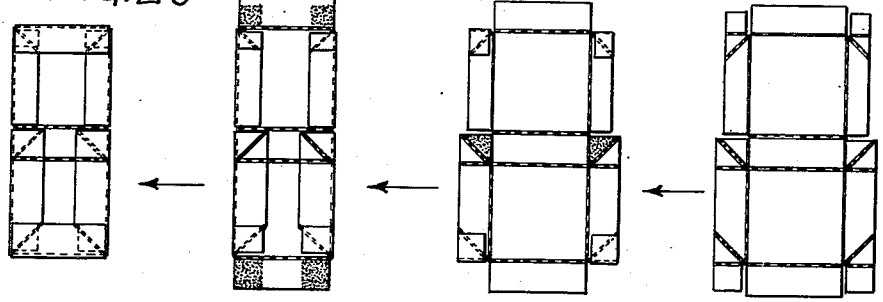
Figure 26 is a view showing a blank for a box of the general type disclosed in Figure 25, but differing slightly in construction.

The types of blanks shown in Figures 25, 26, and 32 may also readily be folded by the novel machine herein disclosed, by simply adjusting the various folding mechanisms thereof, as may be required for each particular type of box.

Various mechanisms of the machine herein disclosed such, for example, as the gumming mechanism, the means for forming the final fold in the blank to complete the formation of the carton, the constructional details of the casings 6 and 7, and the particular means employed for adjusting the several hold-down bars, are but briefly described but in sufficient detail to afford a clear understanding of their utility in conjunction with the various mechanisms with which they are associated.

It is to be understood that the invention is not to be limited to the folding of any specific type of material as it may be used for making card or box-board boxes, paper bags, envelopes, and many other articles made from blanks of sheet material, and which require treatment such as may be rendered by the machine herein disclosed. The machine, as herein disclosed and described, is adapted for making a plurality of folds in a blank during its continuous travel through the machine, and is provided with means for quickly and conveniently adjusting the various operating mechanisms for different sizes and shapes of blanks met with in the paper industry, including envelopes, paper bags, etc. It is obvious that alterations may be made in the constructional details herein disclosed without departing from the scope of the invention, and it is not our intention to limit the invention entirely to the specific structures shown, although some of the details are claimed along with the broader concepts of the invention. The invention is not limited to the folding of diagonally creased blanks as it is readily apparent that the folding mechanisms may be changed or adjusted so as to readily fold a flap which is creased parallel to the direction of travel, or at right angles to the direction of travel. The mechanisms are so constructed and arranged that almost any form or type of flap may be folded, regardless of its position with respect to the bottom panel of the blank, or to the direction of travel of the blank through the machine.

We claim as our invention:

1. In a machine for making collapsible boxes from preformed blanks, each comprising a bottom wall panel having oppositely disposed end wall flaps and oppositely disposed side wall flaps, and each side wall flap having a corner flap at each end extending outwardly from their respective side wall flaps at right angles to the path of travel of the blanks, blank feeding means, means for inwardly folding the corner flaps over their respective side wall flaps, means for folding said side and corner flaps into flatwise relation to the bottom wall panel, and at the same time folding the end portions of the side wall flaps upon themselves along diagonal fold lines whereby the corner flaps are disposed on top of the folded end portions of the side wall flaps, means for gumming predetermined areas of said folded flaps, and means for folding the end wall flaps into bonding engagement with said gummed areas to complete the formation of the box.

2. In a machine for making collapsible boxes from preformed blanks, each comprising a bottom wall panel having oppositely disposed end wall flaps and oppositely disposed side wall flaps and each side wall flap having a corner flap at each end extending outwardly from their respective side wall flaps at right angles to the path of travel of the blanks, blank feeding and registering means, means adapted to engage and raise the ends of the corner flaps out of the plane of of the blank, folder bars receivable between the raised portions of the corner flaps and the end wall flap at each end of the blank adapted to inwardly fold the corner flaps as the blank is advanced, a pair of endless belts operating in timed relation to the traveling movement of the blanks, folder heads carried by said belts and having means adapted to engage and inwardly fold the opposed side wall flaps over the bottom wall panel of the blank, means engageable with the partially folded corner flaps and cooperating with said folder heads to fold the end portions of the side wall flaps upon themselves, simultaneously as the side wall flaps are folded into flatwise relation against the bottom panel, whereby the corner flaps are exposed, means for gumming predetermined areas of said folded flaps, and means for folding the end wall flaps into bonding engagement with said gummed areas to complete the formation of the box.

3. In a machine for making collapsible boxes from preformed blanks, each comprising a bottom wall panel having oppositely disposed end wall flaps and oppositely disposed side wall flaps and each side wall flap having a corner flap at each end extending outwardly from their respective side wall flaps at right angles to the path of travel of the blanks, blank feeding and registering means, rotary means adapted to engage and partially raise the ends of the corner flaps out of the plane of the blank, folder bars receivable between the raised portions of the corner flaps and the end wall flap at each end of the blank adapted to inwardly fold the corner flaps as the blank is advanced, a pair of endless belts operating in timed relation to the traveling movement of the blanks, pairs of oppositely disposed folder heads carried by said belts and having means adapted to engage and inwardly fold the opposed side wall flaps over the bottom wall panel of the blank, stationary means engageable with the partially folded corner flaps and cooperating with said folder heads to fold the end portions of the side wall flaps upon themselves, simultaneously as the side wall flaps are folded into flatwise relation against the bottom panel, whereby one entire surface of each corner flap is exposed, means for gumming predetermined areas of the end wall flaps, and means for folding the gummed end wall flaps into flatwise engagement with the exposed surfaces of the corner flaps to complete the formation of the box.

4. In a machine for making collapsible boxes from preformed blanks, each comprising a bottom wall panel having oppositely disposed side wall flaps and oppositely disposed end wall flaps and each end wall flap having corner flaps extending outwardly from the ends thereof, means for continuously feeding the blanks along a predetermined path in accurately spaced relation, folder heads movable with the blanks below the travel path thereof and having opposed fingers adapted to engage the side wall flaps of each blank and inwardly fold them over the bottom wall panel thereof, means whereby triangular corner portions of the side wall flaps are folded into flatwise relation to their respective side wall flaps, simultaneously as said side wall flaps are folded inwardly over the bottom panel of the blank, and other folder heads movable with the blanks and having fingers adapted to engage only the corner flaps and inwardly fold them over their respective end wall flaps, gumming means, and means for folding the end wall flaps, with the corner flaps disposed in parallel relation thereto, inwardly over the side wall flaps to complete the formation of the box.

5. In a machine for making collapsible boxes from preformed blanks, each comprising a bottom wall panel having oppositely disposed side wall flaps and oppositely disposed end wall flaps and each end wall flap having a corner flap extending from each end thereof, blank feeding means, a pair of oppositely disposed folder heads mounted below the travel path of the blanks and movable with the blanks and adapted to engage intermediate portions of the side wall flaps and inwardly fold them over the bottom wall panels of the blanks, folder bars disposed over the blank and adapted to engage the corner portions of the side wall flaps and outwardly fold them, as the intermediate portions of the side wall flaps are folded inwardly over the bottom wall panel by the folder heads, whereby when the side wall flaps are folded into flatwise relation to the bottom wall panel of the blank, the corner portions of each side wall flap will be folded into flatwise relation with their respective side wall flaps, means for inwardly folding the corner flaps over their respective end wall flaps, means for gumming predetermined areas of said folded flaps, and means for folding the end wall flaps inwardly over the bottom wall panel to complete the formation of the box.

6. In a machine for making collapsed boxes from preformed blanks each comprising a bottom wall panel having oppositely disposed side wall flaps each provided at one end with a corner flap, said bottom panel also having an end wall flap at one end and provided at its opposite end with an end wall panel having a cover panel attached thereto, said cover panel having oppositely disposed side wall flaps alined with the side wall flaps of the bottom wall panel, and having an end wall flap, means for continuously advancing the blanks in spaced relation, a plurality of folder heads movable with the blank and adapted to inwardly fold the side wall flaps of the bottom and cover panels along fold lines disposed transverse to the direction of travel of the blanks, stationary means for folding back corner portions of the side wall flaps of the bottom panel along diagonal fold lines, means for gumming predetermined areas of certain of said flaps, and means for inwardly folding the end wall flap of the bottom panel.

7. In a machine for making collapsible boxes from preformed blanks each comprising a bottom wall panel having side and end wall flaps, means for feeding the blanks through the machine in spaced relation with the side wall flaps disposed crosswise of the travel path of the blanks, folder heads movable with the blanks through the machine and adapted to inwardly fold the side wall flaps over the bottom wall panel, means for folding triangular corner portions of the side wall flaps upon themselves, during the inward folding of said flaps, means for holding said triangular portions in flatwise relation to their respective side wall flaps, and co-operating members disposed transversely of the blank feeding means adapted to pre-break the crease lines along which the side wall flaps are attached to the bottom wall panel, thereby to facilitate inwardly folding the side wall flaps over the bottom wall panel of the blank.

8. In a machine for making collapsible boxes from preformed blanks, each having spaced parallel crease lines along which the side wall flaps of the blank are attached to the bottom wall panel thereof, means for advancing the blanks through the machine, and cooperating members mounted crosswise of the blank advancing means and adapted to engage and pre-break said crease lines to facilitate inwardly folding the side wall flaps over the bottom wall panel of the blank.

9. In a machine for making collapsible boxes from preformed blanks, each comprising a bottom wall panel including oppositely disposed side wall flaps, means for advancing the blanks, and co-acting blade-like members mounted for rotary movement above and below the blank advancing means, crosswise thereof, adapted to engage and pre-break each blank along the lines connecting the side wall flaps to the bottom wall panel, thereby to facilitate accurately inwardly folding the side wall flaps over the bottom panel of the blank.

10. In a machine for making collapsible boxes from preformed blanks, each having spaced parallel crease lines along which the side wall flaps of the blank are attached to the bottom wall panel of the blank, means for advancing the blanks, and pre-breaker blades mounted above and below said advancing means, crosswise thereof, adapted to engage opposite sides of each blank and pre-break or bend the blank along said crease lines, thereby to facilitate the subsequent folding of the side wall flaps into flatwise relation to the bottom wall panel of the blank.

11. In a machine for making collapsible boxes from preformed blanks, each comprising a bottom wall panel including oppositely disposed side wall flaps, co-acting blades mounted one above the path of travel of the blanks and the other below said path, said blades being disposed in crosswise relation to the travel of the blanks through the machine and operating in timed relation to the movement of the blanks and adapted to engage and pre-bend each blank along the fold lines connecting the side wall flaps to the bottom wall panel, thereby to facilitate inwardly folding the side wall flaps over the bottom panel and to insure accurate folding thereof.

12. In a machine of the class described, means for continuously feeding preformed blanks along a predetermined path of travel, folder heads mounted for traveling movement with the blanks, a rock shaft in each folder head, a folder finger secured to each rock shaft and normally positioned beneath the path of travel of the blanks, said folder fingers being arranged in opposed relation, means for actuating said rock shafts to cause the folder fingers to engage the side wall flaps of the blank and inwardly fold them over the bottom wall panel thereof, gumming means, means for inwardly folding the end flaps over the previously folded side wall flaps, and means for retaining said folded flaps in flatwise relation to the bottom wall of the box.

13. In a machine of the class described, means for continuously feeding preformed blanks along a predetermined path of travel, folder heads mounted for traveling movement with the blanks, a rock shaft in each folder head, a folder finger secured to each rock shaft and normally positioned beneath the path of travel of the blanks, a cam bar for actuating each rock shaft to cause said folder fingers to engage the side wall flaps of the blank and inwardly fold them over the bottom wall panel thereof, means for relatively adjusting said cam bars to synchronize the operations of the folder fingers to the movement of the blanks, gumming means, means for inwardly folding the end flaps of the blank over the previously folded side wall flaps, and means for retaining said folded flaps in flatwise relation to the bottom wall of the box until the gum has thoroughly set.

14. In a machine of the class described, means for continuously feeding preformed blanks along a predetermined path of travel, a pair of endless belts having their cooperating runs operating in timed relation to the traveling movement of the blanks through the machine, a plurality of folder heads secured to each of said belts and all of the folder heads on one belt facing in the direction of travel of the blanks and adapted to engage and inwardly fold the trailing side wall flap of each blank, and the folder heads on the adjacent belt facing in the opposite direction and adapted to engage and inwardly fold the leading side wall flap of each blank, whereby said folder heads are arranged in pairs, said belts being independently adjustable to vary the spacing between the folder heads of each pair of folder heads in accordance to the width of box to be formed, a rock shaft in each folder head having a folder finger secured thereto and normally positioned beneath the path of travel of the blanks, and means disposed lengthwise to the path of travel of the blanks for actuating said rock shafts in timed relation to cause the folder fingers to engage the side wall flaps of the blank and inwardly fold them over the bottom wall panel thereof without interrupting the traveling movement of the blanks.

15. In a machine of the class described, means for feeding the blanks through the machine, a pair of oppositely disposed folder heads mounted for traveling movement with said feeding means and each folder head comprising a rock shaft having a finger secured thereto adapted to engage and inwardly fold one of the flaps of the blank over the bottom wall panel thereof, an arm pivoted in each folder head and having a toothed driving connection with its complemental rock shaft whereby, when the arm is oscillated, the folder finger associated therewith is actuated, cam bars for operating said pivoted arms, said cam bars being adjustable independently of one another to control the timing of the folder fingers of said heads, and means whereby the spacing between the folder heads may be varied to adapt the machine for blanks of different sizes and shapes.

16. In a machine for making collapsible boxes of the type wherein all of the side and end walls of the resultant box are folded inwardly over the bottom of the box when the latter is collapsed, a conveyer for constantly feeding the blanks through the machine in accurately spaced relation, a pair of endless belts arranged in spaced parallel relation and having their upper runs traveling in synchronism with the conveyer, a plurality of folder heads carried by said belts, and the folder heads on one of said belts cooperating with the folder heads on the other of said belts to provide a plurality of pairs of folder heads, said belts being adjustable with respect to one another to vary the spacing between the folder heads of each pair in accordance to the size of the blank to be operated upon, and a second pair of endless belts operating in tandem with said first set of endless belts and carrying a plurality of similar folder heads, the folder heads of the first pair of endless belts being positioned to inwardly fold certain of the flaps of a given blank, and the folder heads of the second pair of belts being positioned to inwardly fold other flaps of the blank, said tandem sets of folder heads adapting the machine for a wider range of box types.

17. In a machine of the class described, means for feeding blanks through the machine, a pair of oppositely disposed folder heads mounted for traveling movement with said feeding means and each folder head comprising a rock shaft having a finger secured thereto adapted to engage and inwardly fold one of the flaps of the blank over the bottom wall panel thereof, an arm pivoted in each folder head and having a geared connection with its complemental rock shaft whereby, when said arm is oscillated, the folder finger associated therewith is actuated, and a cam bar for operating each pivoted arm, said cam bars being adjustable independently of one another to control the timing of the folder fingers of said heads.

18. A machine for making collapsed boxes from preformed blanks each comprising a bottom panel and a cover panel interconnected by an end wall panel, and said bottom and cover panels having side wall flaps at opposite sides thereof and the opposed ends of the blank being formed with outwardly extending end wall flaps, and each side wall flap having a corner flap attached to its outer end which corner flaps are substantially alined with the end wall of the flaps at the ends of the blank, means for advancing the blanks through the machine with the bottom and cover panels disposed crosswise to the travel path of the blanks, a plurality of folder heads movable with the blanks below the travel path thereof, said folder heads operating in pairs, and the heads of each pair having oppositely disposed folder fingers, cam means for moving said folder fingers into the path of the moving blanks and fold the side wall flaps over their respective bottom and cover panels and into flatwise relation thereto, means for inwardly folding the corner flaps into flatwise relation with their respective side wall flaps, means for gumming predetermined areas of certain of said flaps, and means for inwardly folding the end wall flaps to complete the formation of the collapsed carton.

19. A machine for making collapsed boxes from preformed blanks each comprising a bottom panel and a cover panel interconnected by an end wall panel, and said bottom and cover panels having side wall flaps at opposite sides thereof and the opposed ends of the blank being formed with outwardly extending end wall flaps, and each side wall flap having a corner flap attached to its outer end which corner flaps are substantially alined with the end wall of the flaps at the ends of the blank, means for raising the ends of the corner flaps out of the plane of the blank, means engageable with the partially raised corner flaps to inwardly fold them as the blank advances, a plurality of folder heads movable with the blanks below the travel path thereof, said folder heads operating in pairs, and the heads of each pair having oppositely disposed L-shaped folder fingers, cam means for moving said folder fingers into the path of the moving blanks and fold the side wall flaps over their respective bottom and cover panels and into flatwise relation thereto, means whereby the corner flaps are simultaneously folded into flatwise relation with their respective side wall flaps, means for gumming predetermined areas of said flaps, and means for inwardly folding the end wall flaps of the bottom and cover panels to complete the formation of the collapsed carton.

EDWIN G. STAUDE.
PAUL E. FISCHER.